United States Patent
Kim et al.

(10) Patent No.: US 8,494,356 B2
(45) Date of Patent: Jul. 23, 2013

(54) COMPACT POP-UP CAMERA FLASHES

(75) Inventors: Tae-hun Kim, Uiwang-si (KR);
Seung-tack Noh, Seoul (KR)

(73) Assignee: Samsung Electronics Co., Ltd.,
Suwon-si (KR)

(*) Notice: Subject to any disclaimer, the term of this patent is extended or adjusted under 35 U.S.C. 154(b) by 0 days.

(21) Appl. No.: 13/271,545

(22) Filed: Oct. 12, 2011

(65) Prior Publication Data
US 2012/0195581 A1 Aug. 2, 2012

(30) Foreign Application Priority Data
Feb. 1, 2011 (KR) ........................ 10-2011-0010303

(51) Int. Cl.
*G03B 15/03* (2006.01)
(52) U.S. Cl.
USPC ........................................................ 396/177
(58) Field of Classification Search
USPC .................................. 396/176, 177
See application file for complete search history.

(56) References Cited

U.S. PATENT DOCUMENTS

| | | | | |
|---|---|---|---|---|
| 4,893,140 A | * | 1/1990 | Yamamoto et al. | 396/177 |
| 5,287,135 A | * | 2/1994 | Arai et al. | 396/174 |
| 6,510,286 B1 | * | 1/2003 | Terada et al. | 396/177 |
| 2004/0228624 A1 | * | 11/2004 | Hsien et al. | 396/176 |

FOREIGN PATENT DOCUMENTS

JP 2007-121813 A 5/2007

OTHER PUBLICATIONS

Search Report established for GB1200267.1 (May 17, 2012).

* cited by examiner

*Primary Examiner* — Clayton E Laballe
*Assistant Examiner* — Noam Reisner
(74) *Attorney, Agent, or Firm* — Drinker Biddle & Reath LLP (57) ABSTRACT

Example pop-up camera flashes are disclosed. A disclosed example pop-up flash of a camera includes a supporting unit; a rotating unit, which is rotatably connected to the supporting unit and is able to rotate between a first position, at which the rotating unit is adjacent to the supporting unit, and a second position, at which the rotating unit is apart from the supporting unit; a sliding unit, which is slidably combined with the rotating unit; a light emitting unit, which is arranged at the sliding unit; a connecting unit, of which a first end is rotatably connected to the sliding unit and a second end is rotatably connected to the supporting unit; and a driving unit, which is connected to the connecting unit and provides a driving force for rotation of the connecting unit.

9 Claims, 7 Drawing Sheets

COMPACT POP-UP CAMERA FLASHES

CROSS-REFERENCE TO RELATED PATENT APPLICATION

This application claims the priority benefit of Korean Patent Application No. 10-2011-0010303, filed on Feb. 1, 2011, in the Korean Intellectual Property Office, the entirety of which is incorporated herein by reference.

BACKGROUND

1. Field of the Invention

The invention relates to pop-up camera flashes, and more particularly, to pop-up flashes suitable for compact, that is, small and thin cameras.

2. Description of the Related Art

A pop-up flash installed in a camera is a light emitting device that is accommodated in the main body of the camera and protrudes from the main body of the camera when it is necessary for the pop-up flash to emit light for a photographing operation.

Recently, cameras are designed to have smaller and thinner profiles. To install a pop-up flash in smaller and thinner cameras, it is necessary for the pop-up flash to have a simplified structure.

A pop-up flash helps to secure a necessary light intensity for a photographing operation. When a pop-up flash emits light toward an object, a path in which the light emitted by the pop-up flash travels may be interrupted by a structure, such as the main body of a camera, and thus a shadow may be formed. To prevent formation of a shadow, it is necessary to appropriately locate the pop-up flash.

SUMMARY

The present application discloses pop-up flashes having a compact configuration suitable for small and thin cameras.

The present application also discloses pop-up flashes that may be sufficiently separated from the main body of a camera so that a sufficient angle may be secured for emitting light toward an object.

The present application further discloses slim pop-up flashes that have a simplified mechanism and employ a relatively small number of parts.

According to an aspect of the invention, there is provided a pop-up flash of a camera, including a supporting unit; a rotating unit, which is rotatably connected to the supporting unit and is able to rotate between a first position, at which the rotating unit is adjacent to the supporting unit, and a second position, at which the rotating unit is apart from the supporting unit; a sliding unit, which is slidably combined with the rotating unit; a light emitting unit, which is arranged at the sliding unit; a connecting unit, of which a first end is rotatably connected to the sliding unit and a second end is rotatably connected to the supporting unit; and a driving unit, which is connected to the connecting unit and provides a driving force for rotation of the connecting unit.

The driving unit may include an elastic member, which is arranged to interconnect the second end of the connecting unit and the supporting unit and provides elastic force to the second end of the connecting unit.

The driving unit may include a motor, which is connected to the second end of the connecting unit and provides the driving force.

The pop-up flash may further include a locking member, which is movably arranged at the supporting unit and is able to move between a locked position at which the locking member is engaged with the sliding unit, and a release position at which the locking member is separated from the sliding unit.

The pop-up flash may further include a button unit, which is arranged at the supporting unit to be connected with the locking member and is to provide a force for moving the locking member to the release position.

The pop-up flash may further include a switching unit, which is arranged at the supporting unit to be connected with the locking member, is operated by an external signal, and is to generate a force for moving the locking member to the release position.

The rotating unit may include a first guiding unit and a second guiding unit, which slidably support two opposite ends of the sliding unit, respectively, the sliding unit may include a first slider and a second slider at two opposite sides, respectively, such that the first slider and the second slider are slidably combined with the first guiding unit and the second guiding unit, respectively, and the sliding unit may slide between a first position at which the sliding unit is inserted into the rotating unit, and a second position at which a portion of the sliding unit protrudes from an end of the rotating unit.

The connecting unit may include a first link, of which a first end is rotatably combined with the first slider and a second end is rotatably combined with the supporting unit, and a second link, of which a first end is rotatably combined with the second slider and a second end is rotatably combined with the supporting unit, and the driving unit may include an elastic member, which interconnects the second end of the second link combined with the supporting unit and the supporting unit and provides a rotation force to the second end of the second link.

The rotating unit may include a housing groove, in which the sliding unit is housed, between the first guiding unit and the second guiding unit, and the sliding unit may be inserted to the housing groove.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, the invention will be described in detail by explaining embodiments of the invention with reference to the attached drawings.

Figure 1:
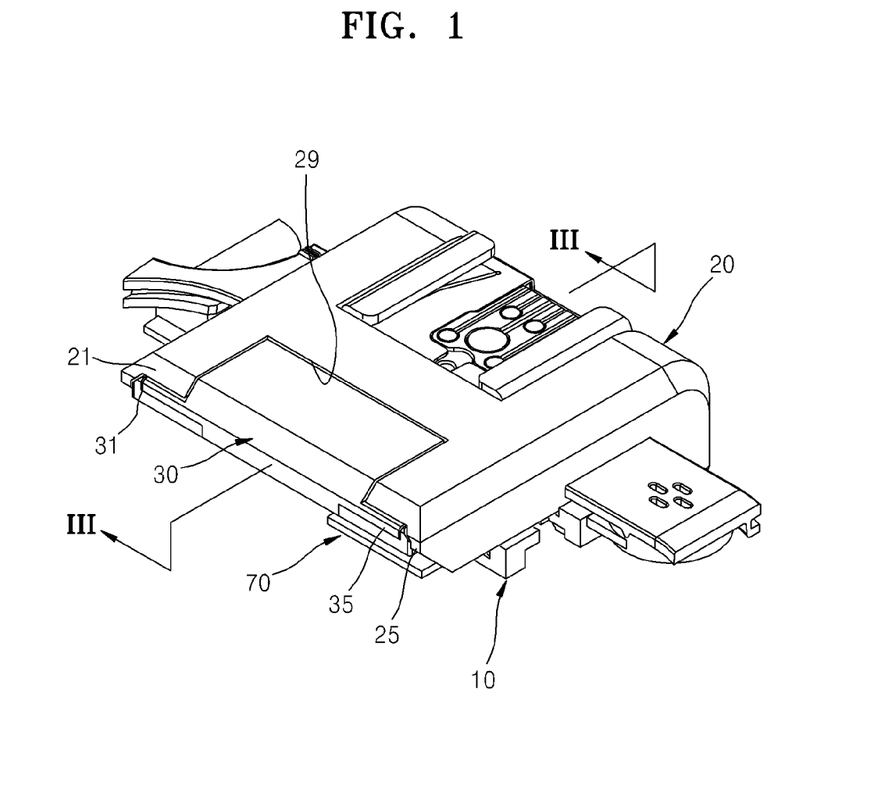
FIG. 1 is a perspective view of a pop-up flash of a camera, according to an embodiment of the invention.
Figure 2:
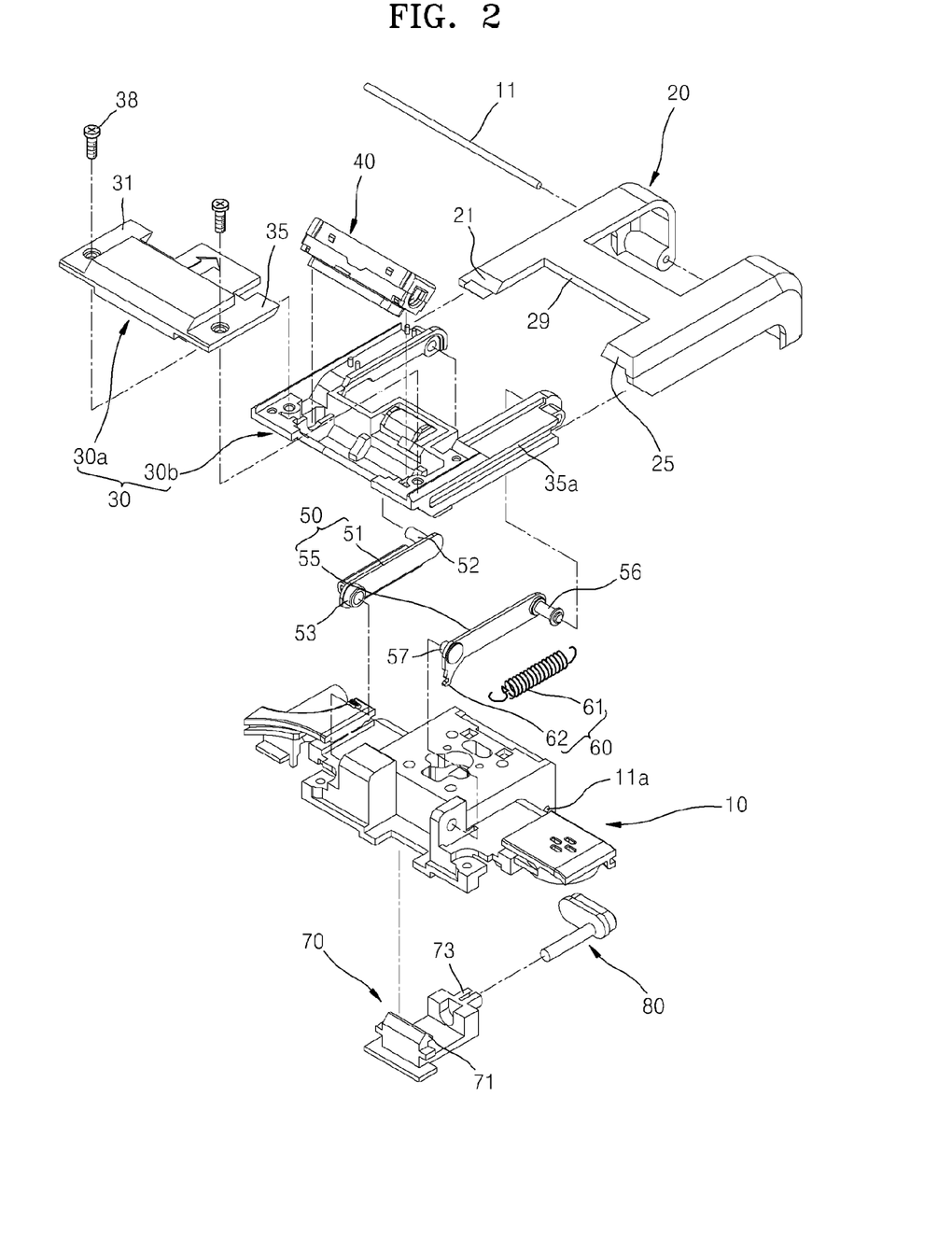
FIG. 2 is an exploded perspective view of components of the pop-up flash of FIG. 1.

FIG. 1 is a perspective view of a pop-up flash of a camera, according to an embodiment of the invention, and FIG. 2 is an exploded perspective view of components of the pop-up flash of FIG. 1.

The pop-up flash of a camera according to the embodiment shown in FIGS. 1 and 2 includes a supporting unit 10, a rotating unit 20 rotatably connected to the supporting unit 10, a sliding unit 30 slide-movably and combined with the rotating unit 20, a connecting unit 50 connected between the sliding unit 30 and the supporting unit 10, and a driving unit 60 that provides a driving force to the connecting unit 50.

The supporting unit 10 is attached to the main body of a camera (not shown) to support components including the rotating unit 20 and the connecting unit 50. However, embodiments of the invention are not limited to the shape of the supporting unit 10 shown in FIGS. 1 and 2, and a part of the main body of a camera may be used as the supporting unit 10 without need for a separate supporting unit 10.

The rotating unit 20 is rotatably connected to the supporting unit 10. The rotating unit 20 is rotatably connected to a pin 11 installed in a supporting hole 11a of the supporting unit 10, and thus the rotating unit 20 may rotate with respect to the supporting unit 10. FIG. 1 shows the state in which the rotating unit 20 is at a first position adjacent to the supporting unit 10. When the rotating unit 20 at the first position rotates with respect to the supporting unit 10, the rotating unit 20 may be moved to a second position apart from the supporting unit 10 as shown, for example, in FIG. 4.

In the pop-up flash having the structure as described above, the rotating unit 20 is held at the first position when a camera is not in use or it is not necessary for the pop-up flash to emit light. The first position corresponds to a housing position at which the pop-up flash is substantially housed in or becomes flush with a surface of the main body of a camera. When the camera is used for a night-time photographing operation or a backlit photographing operation, the rotating unit 20 may be moved to the second position at which the rotating unit 20 is apart from the supporting unit 10 and the pop-up flash may emit light. The second position corresponds to a light emitting position at which the pop-up flash may emit light.

The sliding unit 30 is slidably combined with the rotating unit 20. At the first position shown in FIG. 1, the sliding unit 30 is positioned in a housing groove 29 of the rotating unit 20.

The rotating unit 20 includes a first guiding unit 21 and a second guiding unit 25, which slidably support two opposite ends of the sliding unit 30. The sliding unit 30 includes a first slider 31 and a second slider 35 respectively at two opposite sides, such that the first slider 31 and the second slider 35 may be slidably attached to the first guiding unit 21 and the second guiding unit 25, respectively. Therefore, the sliding unit 30 may slide between a position at which the sliding unit 30 is fully inserted to the housing groove 29 of the rotating unit 20 and another position at which the sliding unit 30 protrudes from an end of the rotating unit 20.

A light emitting unit 40 is arranged on the sliding unit 30. The sliding unit 30 includes a bottom cover 30b, which supports the bottom of the light emitting unit 40, and a top cover 30a, which is combined with the bottom cover 30b via bolts 38 to support the top of the light emitting unit 40. Guiding grooves 35a are formed on two opposite sides of the bottom cover 30b. The guiding grooves 35a may be combined with guiding protrusions (not shown) formed on inner sides of the guiding units 21 and 25 of the rotating unit 20.

The light emitting unit 40 may include a light emitting lamp, a light reflecting cover, a diffusion lens, a charging circuit, etc. Here, because the light emitting unit 40, which is driven by a control signal and emits light, may be embodied with various modifications therein, detailed description of the configuration of the light emitting unit 40 will be omitted.

The connecting unit 50 is arranged between the sliding unit 30 and the supporting unit 10. A first end of the connecting unit 50 is rotatably connected to the sliding unit 30, whereas a second end of the connecting unit 50 is rotatably connected to the supporting unit 10. The connecting unit 50 is connected to the supporting unit 10 at a location in front of a location at which the rotating unit 20 is connected to the supporting unit 10.

Because the rotating unit 20 and the connecting unit 50 connected to the supporting unit 10 form a link assembly, the rotating unit 20 rotation is restricted by a motion range of the connecting unit 50.

The connecting unit 50 includes a first link 51 and a second link 55. A first end of the first link 51 is rotatably connected to the inner side of the first slider 31 via a connecting pin 52, whereas a second end of the first link 51 is rotatably connected to the supporting unit 10 via a connecting shaft 53. A first end of the second link 55 is rotatably connected to the inner side of the second slider 35 via a connecting pin 56, whereas a second end of the second link 55 is rotatably connected to the supporting unit 10 via a connecting shaft 57.

The driving unit 60, which provides a driving force to rotate the connecting unit 50, is connected to the connecting unit 50. The driving unit 60 includes a lever 62, which protrudes from the second end of the second link 55, and an elastic member 61, which connects the lever 62 to the supporting unit 10.

Although a compression coil spring is used as the elastic member 61 in FIG. 2, embodiments of the invention are not limited thereto, and any of various components including a gas cylinder spring, an elastic cable, a leaf spring, etc. may be used.

Although the lever 62 protruding from the second end of the second link 55 is provided to connect the elastic member 61 to the second end of the second link 55, embodiments of the invention are not limited thereto, and, for example, a connecting groove to which the elastic member 61 is connected may be formed on an outer edge of the second end of the second link 55. Alternatively, the driving unit 60 may not include the lever 62 at the second end of the second link 55, and may include a compression coil spring which applies rotation force to the connecting shaft 57 of the second end of the second link 55.

Due to the operation of the driving unit 60 as described above, rotation force is always applied to the second link 55 in one direction.

A locking member 70 and a button unit 80, which transmits operating force of a user to the locking member 70, are arranged at the bottom of the supporting unit 10. The locking member 70 holds the pop-up flash at the first position by engaging with the sliding unit 30.

Figure 3:
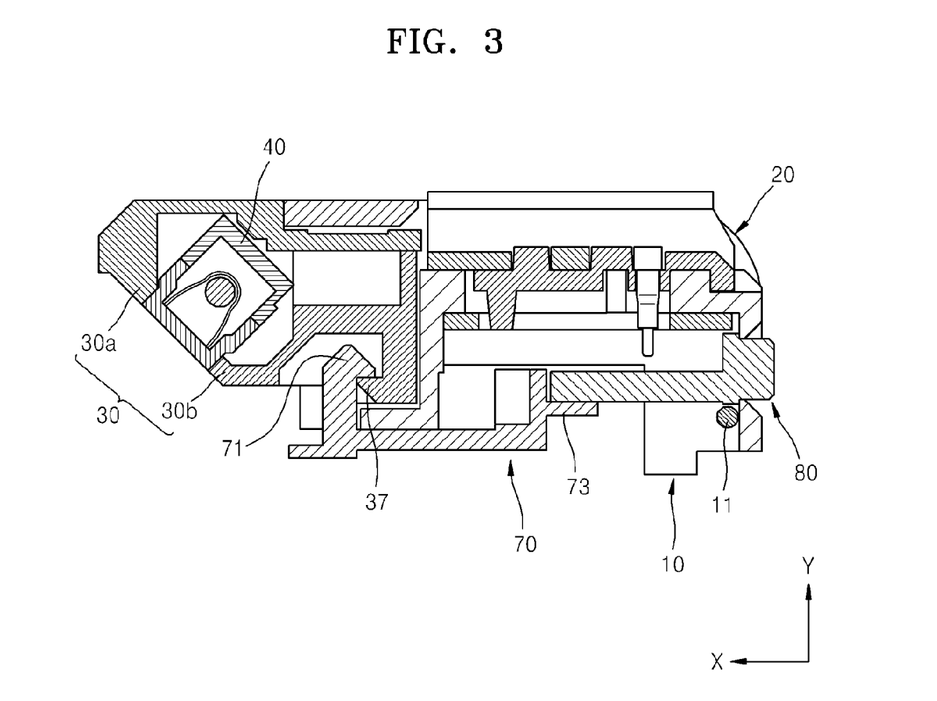
FIG. 3 is a cross-sectional view of the pop-up flash shown in FIG. 1, taken along a line III-III of FIG. 1.
Figure 4:
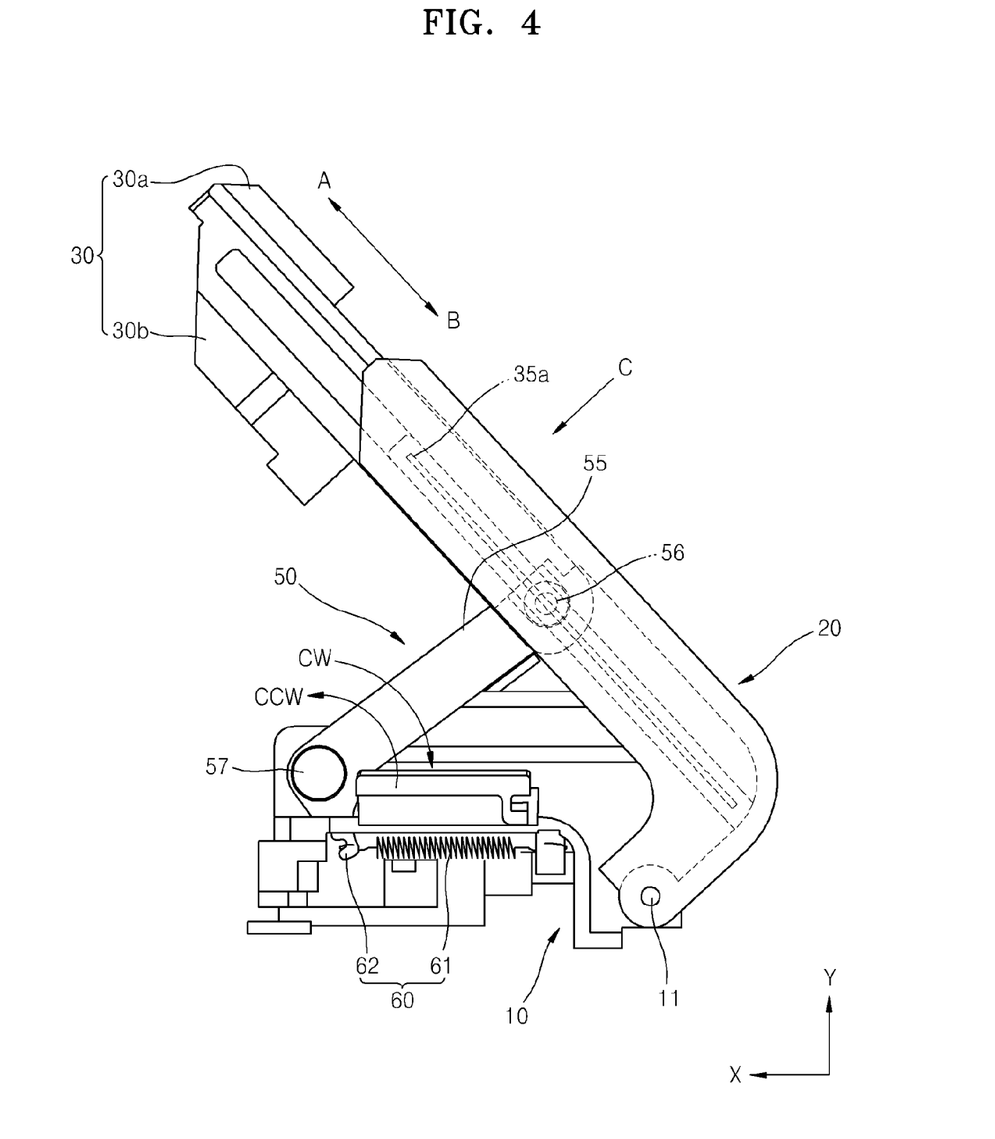
FIG. 4 is a lateral view showing the pop-up flash of FIG. 1 when popped up.
Figure 5:
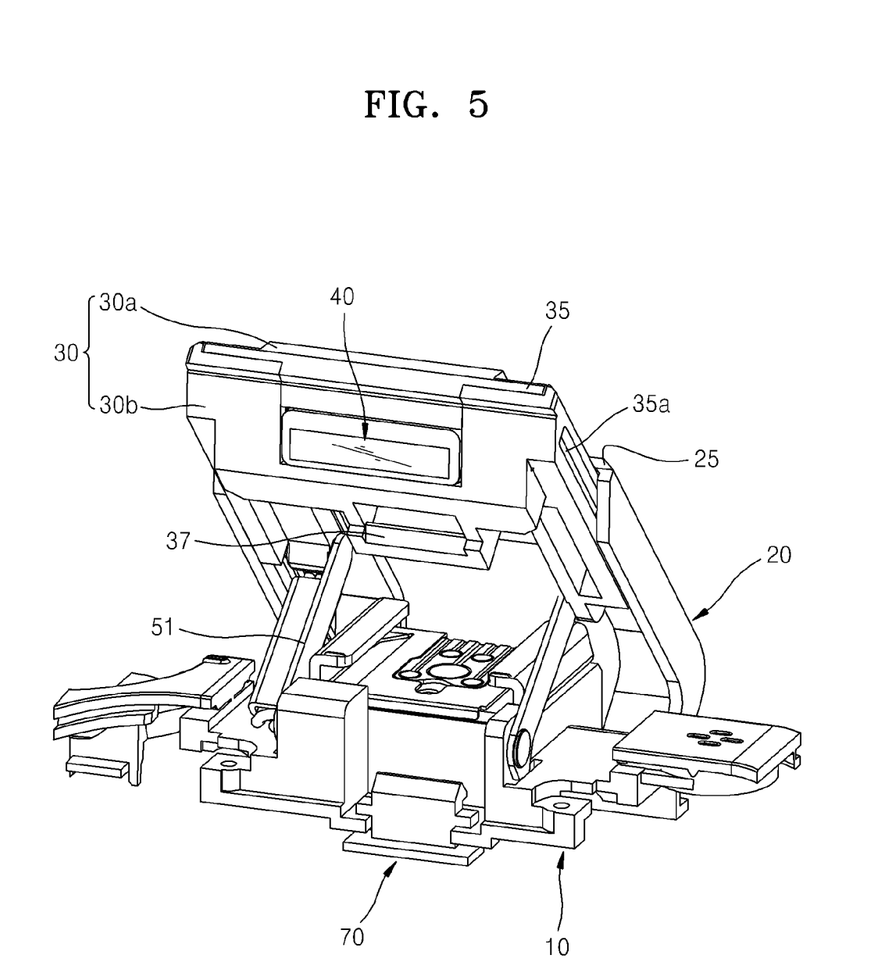
FIG. 5 is a perspective view of the pop-up flash shown in FIG. 4.
Figure 6:
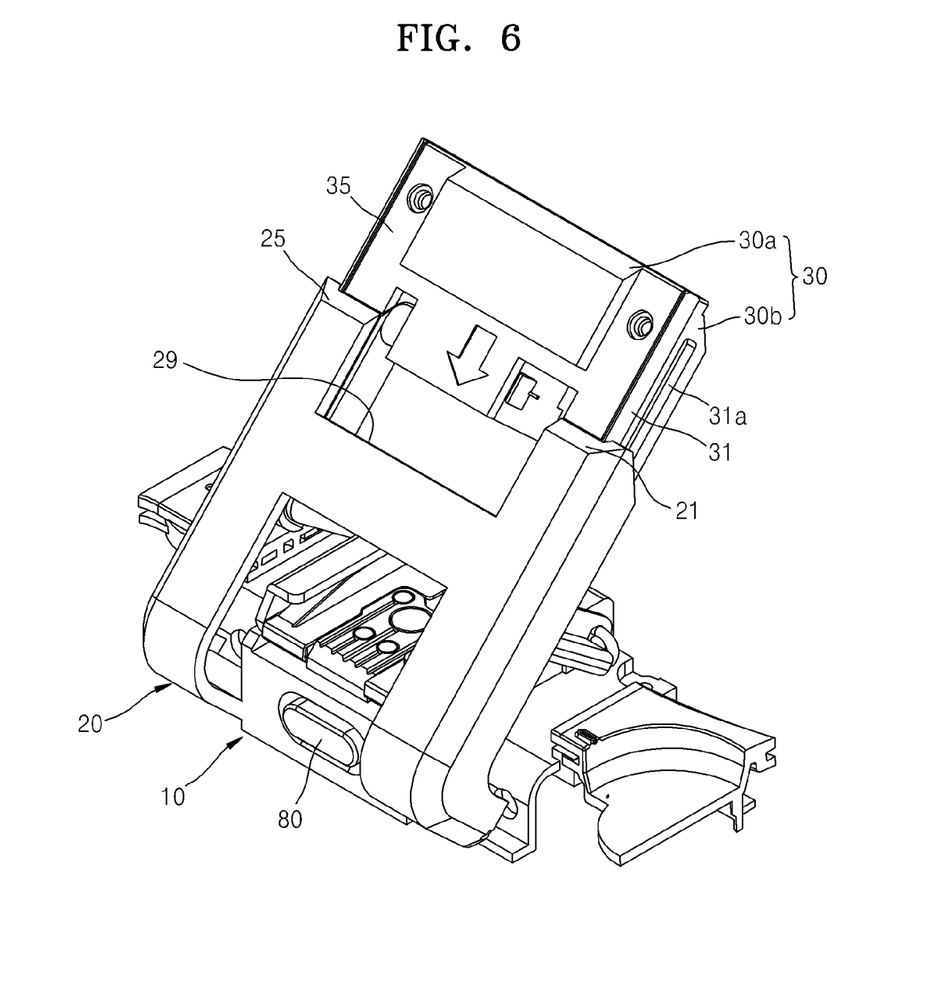
FIG. 6 is a perspective view of the pop-up flash shown in FIG. 4, seen at a different angle.

FIG. 3 is a cross-sectional view of the pop-up flash shown in FIG. 1, taken along a line III-III of FIG. 1. FIG. 4 is a lateral view showing of the pop-up flash shown in FIG. 1 when popped up. FIG. 5 is a perspective view of the pop-up flash shown in FIG. 4. FIG. 6 is a perspective view of the pop-up flash shown in FIG. 4, seen at a different angle.

The locking member 70 includes a combining protrusion 71 at a leading end portion and is arranged to be able to move in the x-axis direction with respect to the supporting unit 10. A locking protrusion 37, which may be combined with the combining protrusion 71, is installed at the bottom of the sliding unit 30.

When the combining protrusion 71 of the locking member 70 is at a locked position at which the combining protrusion 71 of the locking member 70 is combined with the locking protrusion 37 of the sliding unit 30, the rotating unit 20 may be held at the first position adjacent to the supporting unit 10. When the combining protrusion 71 of the locking member 70 is moved at least temporarily to a release position at which the combining protrusion 71 of the locking member 70 is at least temporarily separated from the locking protrusion 37 of the sliding unit 30, the rotating unit 20 may be moved to the second position, where the rotating unit 20 is rotated to be apart from the supporting unit 10. As described above, the locking member 70 is arranged at the supporting unit 10 to be able to move between the locked position and the release position.

An end of the button unit 80 contacts a transmission unit 73 arranged behind the locking member 70. The button unit 80 is arranged at the supporting unit 10 to be connected with the locking member 70, and, when the locking member 70 is at the locked position, may be used to transmit force, such that the locking member 70 may be moved to the release position.

The button unit 80 is also arranged to be able to move in the x-axis direction from behind of the supporting unit 10 toward the front of the supporting unit 10. Therefore, when a user presses the button unit 80 in the x-axis direction, the pressing force is transmitted to the locking member 70 via the button unit 80 and, thus, the locking member 70 moves forward in the x-axis direction.

Although it is configured that the button unit 80 is hand-operated by a user to move the locking member 70 in the above embodiment, embodiments of the invention are not limited thereto. For example, a switching unit (not shown), which is operated according to external signals, may be arranged at the supporting unit 10. Accordingly, when it is necessary to operate a pop-up flash, the switching unit may generate force to move the locking member 70 to the released position, and thus the rotating unit 20 may be automatically rotated without a user operation.

FIG. 4 shows the state in which the rotating unit 20 has rotated with respect to the supporting unit 10 via the pin 11 and has moved to the second position apart from the supporting unit 10. While the rotating unit 20 is being moved to the second position, the sliding unit 30 connected to the connecting unit 50 moves in the direction indicated by the arrow A to protrude from an end of the rotating unit 30.

In the state illustrated in FIG. 4, the light emitting unit 40 is located at a position upwardly apart from the supporting unit 10 in the y-axis direction and, thus, interference of light emitted by the light emitting unit 40 due to the main body of a camera may be significantly reduced.

Because elastic force is always applied to the lever 62 at the second end of the second link 55 by the elastic member 61 of the driving unit 60 as described above, when the locking member 70 at the locked position in FIG. 3 moves in the x-axis direction and is separated from the locking protrusion 37, the second link 55 rotates in the counterclockwise direction around the connecting shaft 57. As a result, the sliding unit 30 connected to the first end of the connecting unit 50 is automatically moved in the direction indicated by the arrow A.

FIGS. 5 and 6 respectively show guiding grooves 31*a* and 35*a* that are respectively formed in the first slider 31 and the second slider 35 at two opposite sides of the sliding unit 30 to guide sliding motion of the sliding unit 30 with respect to the rotating unit 20.

To move the rotating unit 20 at the second position as shown in FIGS. 4 through 6 to the first position as shown in FIG. 3, a user presses the rotating unit 20 in the direction indicated by the arrow C. Due to the pressing force transmitted to the rotating unit 20, the connecting unit 50 is rotated in the clockwise direction with respect to the supporting unit 10, and the sliding unit 50 connected to the first end of the connecting unit 50 is moved in the direction indicated by the arrow B.

A pop-up flash of a camera having the configuration as described above operates the driving unit 60, the connecting unit 50, the rotating unit 20, and the sliding unit 30, which are connected to each other and form a link assembly, in connection with each others. In other words, because pop-up operation of the pop-up flash, that is, motion of the rotating unit 20 to the second position is automatically performed by a driving force of the driving unit 60, the pop-up flash may be quickly prepared to emit light.

Furthermore, as shown in the attached drawings, a pop-up flash integrated in the main body of a camera has an overall compact and thin configuration and, thus, the pop-up flash is suitable for a compact camera. Furthermore, since the light emitting unit 40 protrudes from the rotating unit 20, an operating mechanism of the light emitting unit 40 that is sufficiently separated from the main body of a camera may be embodied without using additional components and, thus, a number of necessary components may be reduced.

Figure 7:
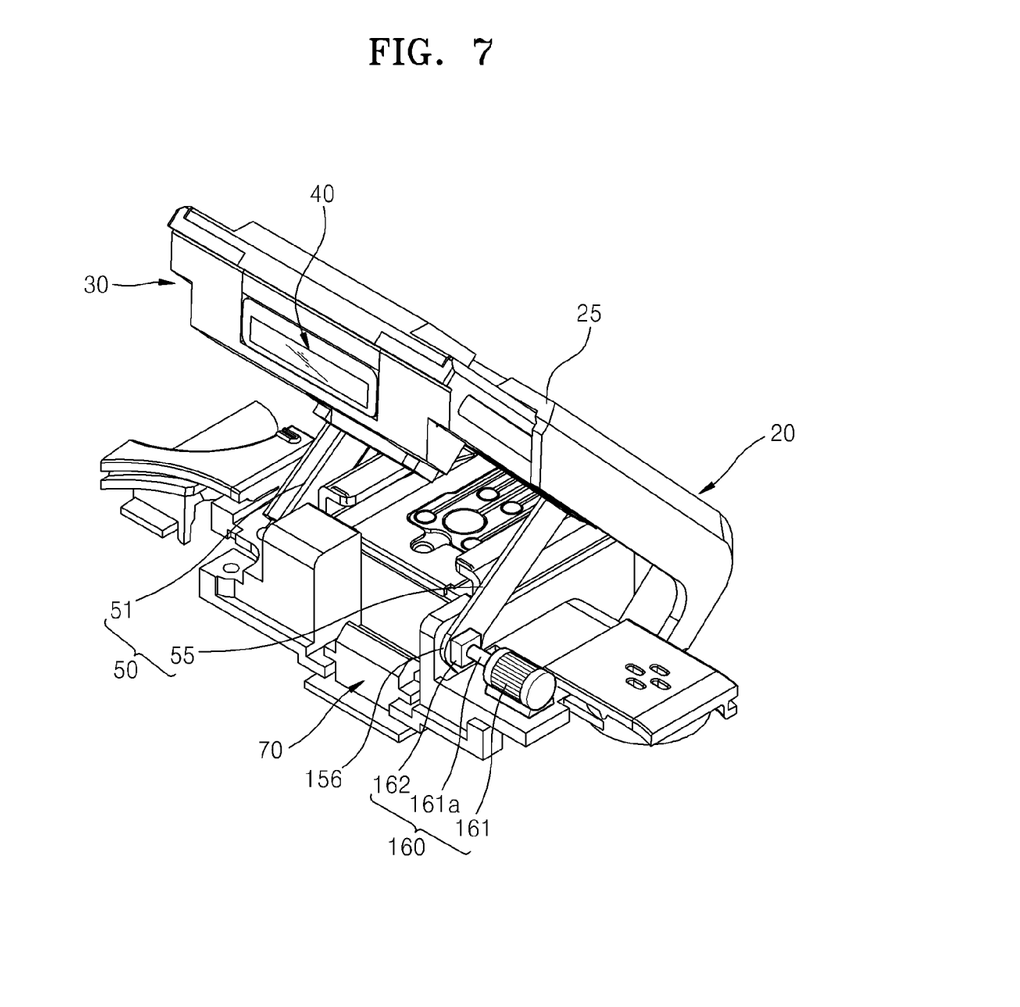
FIG. 7 is a perspective view of a pop-up flash of a camera, according to another embodiment of the invention.

FIG. 7 is a perspective view of a pop-up flash of a camera, according to another embodiment of the invention.

The pop-up flash of a camera according to the embodiment shown in FIG. 7 includes the supporting unit 10, the rotating unit 20 that is rotatably connected to the supporting unit 10 and may rotate between the first position and the second position, the sliding unit 30 which is slidably combined with the rotating unit 20, the connecting unit 50 connected to the sliding unit 30 and the supporting unit 10, a driving unit 160 which provides driving force to the connecting unit 50, and the locking member 70 which may hold the sliding unit 30 at the first position.

Since the pop-up flash shown in FIG. 7 is overall similar to the pop-up flash according to the embodiment shown in FIGS. 1 through 6, like reference numerals denote like elements, and detailed descriptions thereof are omitted.

In the pop-up flash of a camera according to the embodiment shown in FIG. 7, the driving unit 160 has a different configuration as compared to the driving unit 60 of FIGS. 1 through 6. The driving unit 160 includes a motor 161 which provides driving force and a decelerating unit 162 which interconnects a rotating shaft 161*a* of the motor 161 and a second end 156 of the second link 55, decelerates driving force of the motor 161, and transmits the decelerated driving force.

The motor 161 may be operated by an external signal and may generate a driving force for rotating the second link 55. Therefore, when it is necessary to operate the pop-up flash, a control unit (not shown) of a camera may operate the motor 161 and, thus, the rotating unit 20 may be automatically moved to the second position shown in FIG. 7. Furthermore, when it is not necessary to operate the pop-up flash, the rotating unit 20 may be automatically moved to the first position adjacent to the supporting unit 10 by the driving force of the motor 161.

In a pop-up flash of a camera according to embodiments as described above, a rotating unit may rotate between a first position and second position, and a sliding unit supporting a light emitting unit may slide with respect to the rotating unit due to operations of a connecting unit and a driving unit. Therefore, a sufficient light emitting angle may be secured, and interference of light emitted by the light emitting unit due to the main body of a camera may be significantly reduced.

Furthermore, the driving unit, the connecting unit, the rotating unit, and the sliding unit, which form a link assembly by being connected to each other, operate in connection with each other. Pop-up operation of the pop-up flash, that is, motions including rotation of the rotating unit to the second position and sliding of the sliding unit are automatically performed by a driving force of the driving unit and, thus, the pop-up flash may be quickly prepared to emit light.

Furthermore, a pop-up flash integrated in the main body of a camera has an overall compact and thin configuration and, thus, the pop-up flash is suitable for a compact camera. Furthermore, since the light emitting unit protrudes from the rotating unit, an operating mechanism of the light emitting unit that is sufficiently separated from the main body of a camera may be embodied without using additional components.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A pop-up flash of a camera, comprising:
a supporting unit;
a rotating unit, which is rotatably connected to the supporting unit and is able to rotate between a first position, at which the rotating unit is adjacent to the supporting unit, and a second position, at which the rotating unit is apart from the supporting unit;
a sliding unit, which is slidably combined with the rotating unit;
a light emitting unit, which is arranged at the sliding unit;
a connecting unit, of which a first end is rotatably connected to a fixed pivot axis with respect to the sliding unit and a second end is rotatably connected to the supporting unit; and
a driving unit, which is connected to the connecting unit and provides a driving force for rotation of the connecting unit.

2. The pop-up flash of the camera of claim 1, wherein the driving unit comprises an elastic member, which is arranged to interconnect the second end of the connecting unit and the supporting unit and provides elastic force to the second end of the connecting unit.

3. The pop-up flash of the camera of claim 1, wherein the driving unit comprises a motor, which is connected to the second end of the connecting unit and provides the driving force.

4. The pop-up flash of the camera of claim 1, further comprising a locking member, which is movably arranged at the supporting unit and is able to move between a locked position at which the locking member is engaged with the sliding unit, and a release position at which the locking member is separated from the sliding unit.

5. The pop-up flash of the camera of claim 4, further comprising a button unit, which is arranged at the supporting unit to be connected with the locking member and is to provide a force for moving the locking member to the release position.

6. The pop-up flash of the camera of claim 4, further comprising a switching unit, which is arranged at the supporting unit to be connected with the locking member, is operated by an external signal, and is to generate a force for moving the locking member to the release position.

7. The pop-up flash of the camera of claim 1, wherein the rotating unit comprises a first guiding unit and a second guiding unit, which slidably support two opposite ends of the sliding unit, respectively, the sliding unit comprises a first slider and a second slider at two opposite sides, respectively, such that the first slider and the second slider are slidably combined with the first guiding unit and the second guiding unit, respectively, and the sliding unit is able to slide between a first position at which the sliding unit is inserted into the rotating unit, and a second position at which a portion of the sliding unit protrudes from an end of the rotating unit.

8. The pop-up flash of the camera of claim 7, wherein the connecting unit comprises a first link, of which a first end is rotatably combined with the first slider and a second end is rotatably combined with the supporting unit, and a second link, of which a first end is rotatably combined with the second slider and a second end is rotatably combined with the supporting unit, and the driving unit comprises an elastic member, which interconnects the second end of the second link combined with the supporting unit and the supporting unit and provides a rotation force to the second end of the second link.

9. The pop-up flash of the camera of claim 7, wherein the rotating unit comprises a housing groove, in which the sliding unit is housed, between the first guiding unit and the second guiding unit, and the sliding unit is inserted to the housing groove.

* * * * *